United States Patent [19]

Gregory et al.

[11] Patent Number: 5,423,906
[45] Date of Patent: Jun. 13, 1995

[54] TRISAZO DYES, INKS COMPRISING SAME AND THEIR USE IN INK JET PRINTING

[75] Inventors: Peter Gregory, Bolton; Prahalad M. Mistry, Ashton-under-Lyne, both of United Kingdom

[73] Assignee: Zeneca Limited, London, England

[21] Appl. No.: 108,425

[22] Filed: Aug. 19, 1993

[30] Foreign Application Priority Data

Aug. 24, 1992 [GB] United Kingdom ............... 9217964

[51] Int. Cl.$^6$ .............................................. C09D 11/02
[52] U.S. Cl. .................................. 106/22 K; 534/680; 534/815; 428/537.5
[58] Field of Search .............. 106/22 K, 20 D; 534/666, 680, 754, 755, 815; 428/537.5

[56] References Cited

U.S. PATENT DOCUMENTS

| | | | |
|---|---|---|---|
| 4,097,476 | 6/1978 | Wicki | 534/815 |
| 4,468,348 | 8/1984 | Wicki | 534/680 |
| 4,592,756 | 6/1986 | Kawasaki et al. | 106/22 K |
| 4,734,489 | 3/1988 | Kawasaki et al. | 106/22 K |
| 4,836,827 | 6/1989 | Püntener | 534/815 |
| 5,198,022 | 3/1993 | Aulick et al. | 106/22 K |

FOREIGN PATENT DOCUMENTS

| | | | |
|---|---|---|---|
| 2525418 | 1/1976 | Germany | 534/680 |
| 289682 | 12/1987 | Japan | 534/680 |
| 773913 | 5/1957 | United Kingdom | 534/680 |
| 2200918 | 8/1988 | United Kingdom | 534/680 |

*Primary Examiner*—Helene Klemanski
*Attorney, Agent, or Firm*—Cushman Darby & Cushman

[57] ABSTRACT

A compound of Formula (1) or salt thereof:

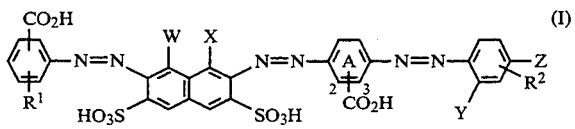

wherein:

$R^1$ is H, $C_{1-4}$-alkyl, $C_{1-4}$-alkoxy, $CO_2H$, $SO_3H$ or $-NR^3R^4$;

$R^2$ is H, $C_{1-4}$-alkyl, $C_{1-4}$-alkoxy, $CO_2H$ or $SO_3H$;

$R^3$ and $R^4$ are each independently H, $C_{1-18}$-alkyl or $R^3$ and $R^4$, together with the nitrogen atom to which they are attached, form an optionally substituted 5- or 6-membered ring;

W is $-OH$ and X is $-NH_2$, or W is $-NH_2$ and X is $-OH$; and

Y and Z are each independently $-OH$ or $-NR^3R^4$.

The compound is suitable for use as a black component of ink jet printing inks.

12 Claims, No Drawings

TRISAZO DYES, INKS COMPRISING SAME AND THEIR USE IN INK JET PRINTING

This invention relates to a trisazo compound and inks produced therefrom, and in particular to a black trisazo dye which is suitable for the coloration of various substrates.

According to a first aspect of present invention there is provided a compound of Formula (1) or salt thereof:

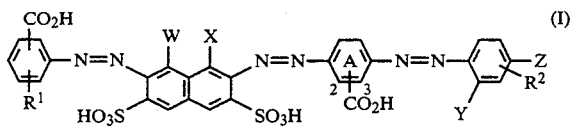

wherein:
$R^1$ is H, $C_{1-4}$-alkyl, $C_{1-4}$-alkoxy, $CO_2H$, $SO_3H$ or $-NR^3R^4$;
$R^2$ is H, $C_{1-4}$-alkyl, $C_{1-4}$-alkoxy, $CO_2H$ or $SO_3H$;
$R^3$ and $R^4$ are each independently H, $C_{1-18}$-alkyl or $R^3$ and $R^4$, together with the nitrogen atom to which they are attached, form an optionally substituted 5- or 6-membered ring;
W is $-OH$ and X is $-NH_2$, or W is $-NH_2$ and X is $-OH$; and
Y and Z are each independently $-OH$ or $-NR^3R^4$.

$R^1$ is preferably H, diethylamino, dibutylamino or $CO_2H$, especially $C_2H$.

$R^2$ is preferably H.

$R^3$ and $R^4$ are preferably H or $C_{1-12}$-alkyl, more preferably H or $C_{2-6}$-alkyl. The 5- or 6-membered ring, which may be formed by $R^3$, $R^4$ and the nitrogen atom to which they are attached, is preferably a substituted or unsubstituted pyrrole, pyrrolidine, pyrroline, morpholine, piperazine or piperidine ring, more preferably a piperazine ring having 1 or 2 methyl groups attached to each of the ring carbon atoms, especially piperazine, 2-methylpiperazine, 2,5-dimethylpiperazine and 2,2,3,3,5,5,6,6-hexamethylpiperazine.

When X is $-OH$ it is preferred that the carboxy group on Ring A is at the 2-position indicated above and when X is $-NH_2$ the carboxy group on Ring A is preferably at the 3-position.

It is preferred that W is $-NH_2$ and X is hydroxy because such compounds have particularly high water fastness when printed on paper.

It is preferred that one of Y and Z is $-OH$ and the other is $-NR^3R^4$.

As will be understood compounds of Formula (1) may be drawn in tautomeric forms other than that shown above, for example where W or X is in keto form and the adjacent azo group is drawn as $=N-NH-$, such tautomers are included in the definition provided by Formula (1).

Preferably the compound of Formula (1) has at least as many carboxy groups as sulpho groups.

Preferably only one of $R^1$, $R^2$, Y and Z is $-NR^3R^4$.

A composition containing two compounds of the invention is also useful as a colorant for inks used in ink jet printing. Accordingly the present invention also provides a composition containing a first and second compound of Formula (1), preferably in a weight ratio of 95:5 to 5:95, more preferably 80:20 to 20:80, especially 40:60 to 60:40. It is preferred that the first and second compounds are identical in every respect except that in the first compound Y is $-NH_2$ and Z is $-OH$ and in the second compound Y is $-OH$ and Z is $-NH_2$.

The compounds and composition of the present invention are preferably in the form of salts, especially the alkali metal, ammonium or substituted ammonium salt.

The present compounds can be converted into their ammonium or substituted ammonium salt by dissolving the dye in the form of its alkali metal salt in water, acidifying with a mineral acid, adjusting the solution to pH 9–9.5 with ammonia or an amine and removing alkali metal chloride ions by dialysis.

The present dyes my be prepared by diazotising a compound of Formula (2) and coupling with a compound of Formula (3), wherein $R^1$, $R^2$, W, X, Y and Z are as hereinbefore defined:

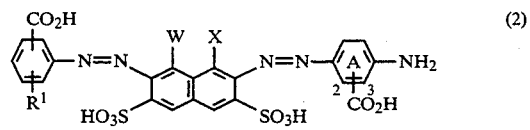

The compound of Formula (2) may be prepared by diazotising an aniline compound substituted by carboxy and $R^1$, coupling under acid conditions with 1-hydroxy-8-aminonaphthalene-3,6-disulphonic acid to give a monoazo compound, diazotising and coupling a monoprotected carboxy phenylene-1,4-diamine to the monoazo compound followed by deprotection of the resultant disazo compound to give a compound of Formula (2).

An example of a monoprotected carboxyphenylene-1,4-diamine is N-acetylphenylene-1,4-diamine.

As examples of aniline compounds substituted by carboxy and $R^1$ there may be mentioned 5-aminoisophthalic acid, 3-carboxyaniline, 4-carboxyaniline, 2-methyl-5-carboxyaniline, 2-carboxy-4-sulphoaniline, 4-diethylamino-3-carboxy aniline and 4-dibutylamino-3-carboxy aniline.

As examples of compounds of Formula (3) there may be mentioned 3-aminophenol,3-diethylaminophenol and m-phenylenediamine.

The compounds may be diazotised by methods known in the dyestuff art, for example by treatment with a diazotising agent (e.g. a nitrite) at below about 5° C. in the presence of alkali or mineral acid, e.g. HCl.

It is convenient to prepare compositions as hereinbefore described using mixtures of 2 compounds of Formula (2) which are identical in every respect except that in a first compound Y is $-OH$ and Z is $-NR^3R^4$ and in a second compound Y is $-NR^3R^4$ and Z is $-OH$. If desired the composition may be separated into individual components, e.g. using preparative chromatography, but generally this is not necessary and for commercial reasons need not be performed.

We have found that the water-fastness of the present compound on the paper is increased if they are printed from an aqueous medium in the form of an ammonium or substituted ammonium salt. Examples of amines used to form such salts include methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine, triethylamine and mixtures thereof.

It is not essential that the compounds are completely in the form of the ammonium salt or substituted ammonium salt and mixed alkali metal and either ammonium salt or substituted ammonium salt are effective, especially those in which at least 50% of the cations are ammonium or substituted ammonium ions. It is particularly preferred that the compounds of Formula (1) are in the form of their ammonium or mixed ammonium-/alkali metal salt.

A suitable ink comprises a mixture of one or more compounds according to the first aspect of the present invention and a liquid medium, preferably an aqueous medium, for example an ink analogous to those described in U.S. Pat. No. 4,963,189. It is preferred that the compound or compounds are completely dissolved in the liquid medium to form a solution.

The ink preferably contains from 0.5% to 20%, more preferably from 0.5% to 15%, and especially from 1% to 5%, by weight of a compound of Formula (1) or salt thereof based on the total weight of the ink.

The liquid medium is preferably water or a mixture comprising water and a water-soluble organic solvent, preferably respectively in a weight-to-weight ratio of 99:1 to 1:99, more preferably 95:1 to 50:50, especially 90:10 to 60:40.

The water-soluble organic solvent is preferably a $C_1$–$C_4$-alkanol such as methanol, ethanol, n-propanol, isopropanol, n-butanol, sec-butanol, tert-butanol or isobutanol; an amide such as dimethylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a $C_2$–$C_6$ alkylene group such as ethylene glycol, propylene glycol, butylene glycol or triethylene glycol; a thiodiglycol, hexylene glycol, or diethylene glycol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol, 2-pyrollidone or N-methylpyrrolidone; or a mixture containing two or more of the aforementioned water-soluble organic solvents.

The preferred water-soluble organic solvent is an alkylene glycol or lower alkyl ether of a polyhydric alcohol such as ethylene glycol, diethylene glycol, triethylene glycol or 2-methoxy-2-ethoxy-2-ethoxyethanol; or a polyethylene glycol with a molecular weight of up to 500. A preferred specific solvent mixture is a binary mixture of water and diethylene glycol in a weight-to-weight ratio as mentioned above.

A further aspect of the present invention provides a process for printing a substrate with an ink using an ink jet printer, characterised in that the ink contains at least one compound according to the first aspect of the present invention.

A preferred process for the application of an ink as hereinbefore defined to a substrate, for example paper, comprises forming the ink into small droplets by ejection from a reservoir through a small orifice by the application of heat so that the droplets of ink are directed at the paper substrate. This printing process is referred to as thermal ink jet printing and is used to form a record on the paper substrate by the programmed application of pulses of heat to the ink adjacent to the orifice during relative movement between the substrate and the reservoir.

The preferred substrate is a cellulosic substrate, especially paper.

According to a still further aspect of the present invention there is provided paper printed with a compound according to the invention.

The invention is further illustrated by the following Examples in which all parts and percentages are by weight unless otherwise indicated.

EXAMPLE 1

Preparation of a composition comprising 2 compounds of the Formula (4), where Y is OH and Z is $NH_2$ and Y is $NH_2$ and Z is OH

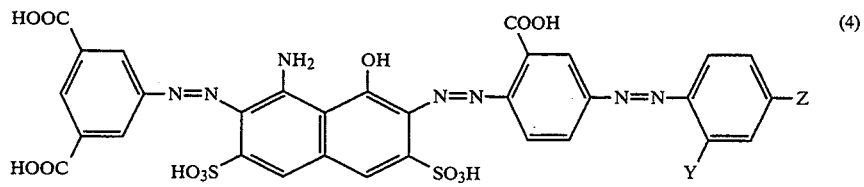

Stage 1

5-aminoisophthalic acid (18.1 g, 0.1M) was stirred in water (500 ml) at room temperature and 2N NaOH added to form a solution at pH 8.0. 2N $NaNO_2$ solution (50 ml) was added and the mixture stirred to homogenise. The solution was added gradually to a mixture of ice/water (150 ml) and 36% HCl (50 ml) at 5° C. and the resultant suspension stirred for 2 hours at 5° C. Sulphamic acid solution (10%) was added to remove excess nitrous acid and give a diazo suspension.

1-Hydroxy-8-aminonapthalene-3,6-disulphonic acid (39 g, 0.1M) was stirred in water (500 ml) and 2N NaOH added to form a solution at pH 7.0. The solution was added to the above diazo suspension to give a dull red suspension which was stirred for 16 hours at 10° C., before raising the pH to 7.0 by addition of 2N NaOH solution and heating at 70° C. 25% NaCl (w/v) was added and the precipitated dye collected by filtration and washed with NaCl aqueous solution (25%, 200 ml) to give a paste.

Stage 2

2-Carboxy-4-acetylamino aniline (19.4 g, 0.1M) was stirred in water (300 ml) at room temperature and 2N NaOH added to form a solution at pH 8.0. 2N $NaNO_2$ (50 ml) was added and the mixture stirred to homogenise. The solution was added gradually to a mixture of ice/water (150 ml) and 36% HCl (50 ml) at 5° C. and the resultant suspension stirred for 2 hours at 5° C. Sulphamic acid solution (10%) was added to destroy excess nitrous acid and give a second diazo suspension.

The paste from Stage 1 (0.1M) was dissolved in water (400 ml) at pH 7.0 with addition of 2N NaOH solution and stirred at 0°–5° C. The second diazo suspension was added over 5 minutes maintaining the pH at 6 to 7 with 2N NaOH solution.

Stage 3

Sodium hydroxide pellets (72 g) were added to the total liquor from Stage 2 and the solution was heated at 70°–80° C. for 2 hours, after which hydrolysis was complete. Whilst hot the solution was neutralised to pH 7.0 with 36% hydrochloric acid and 10% NaCl (w/v) was added. The precipitated dye was collected by filtration and washed with NaCl aqueous solution (20% w/v, 500 ml) to give a paste.

Stage 4

The paste from Stage 3 (0.1M) was dissolved in water (500 ml). 2N NaNO$_2$ solution (50 ml) was added and the mixture stirred for 5 minutes before adding gradually to a mixture of ice/water (150 ml) and 36% HCl (50 ml) at 5° C. with rapid agitation. The resultant suspension was stirred for 3 hours at 5° C. Sulphamic acid solution (10%) was added to destroy excess nitrous acid to give a third diazo suspension. 3-Aminophenol (10.9 g, 0.1M) was dissolved in water (150 ml) with addition of 2N NaOH solution at pH 9.0. The solution was then added to the third diazo suspension and the pH adjusted to 8–9 using 2N NaOH solution. The resultant solution was stirred for 2 hours at 0°–10° C., heated to 70° C., NH$_4$Cl (10% w/v) was added and the precipitated dye collected by filtration and washed with 10% NH$_4$Cl solution (500 ml).

The product was stirred in water (500 ml) at pH 8–9 until a complete solution was obtained. The solution was then slowly added to a mixture of concentrated hydrochloric acid (45 ml) and water (50 ml) and the suspension stirred for 30 minutes and then filtered to give a paste.

The paste was stirred in water (300 ml) and concentrated ammonium hydroxide added to raise the pH to 9–9.5. The solution was then dialysed to remove chloride ions and solvent evaporated to give the mixed ammonium-sodium salt of the title product having an Emax of 57,000 at 636 nm.

When made into an ink (2.5 parts of title product in water 92.5/diethylene glycol (7.5)) and printed onto plain paper using a thermal ink jet printing machine, the printed image has a very high resistance to water and a deep black shade.

EXAMPLES 2 to 9

The method of Example 1 may be repeated except that in place of 5-aminoisophthalic acid there is used 0.1 mole of the compound listed below:

| Example No | Compound |
| --- | --- |
| 2 | 2-carboxyaniline |
| 3 | 3-carboxyaniline |
| 4 | 4-carboxyaniline |
| 5 | 2-aminoterephthalic acid |
| 6 | 3-aminophthalic acid |
| 7 | 3-amino-4-methylbenzoic acid |
| 8 | 3-carboxy-4-piperizinyl aniline |
| 9 | 4-methyl-2-carboxyaniline |

EXAMPLES 10 to 14

The method of Example 1 may be repeated except that in place of 3-Aminophenol used in Stage 4 there is used 0.1 mole of the compound listed below:

| Example No | Compound |
| --- | --- |
| 10 | N-methyl-3-aminophenol |
| 11 | N,N-dimethyl-3-aminophenol |
| 12 | 1,3-diaminobenzene |
| 13 | 1,3-dihydroxybenzene |
| 14 | Sulpho-1,3-diaminobenzene |

EXAMPLE 15

Preparation of a composition comprising two compounds of the Formula (5), where Y is OH and Z is NH$_2$ and Y is NH$_2$ and Z is OH

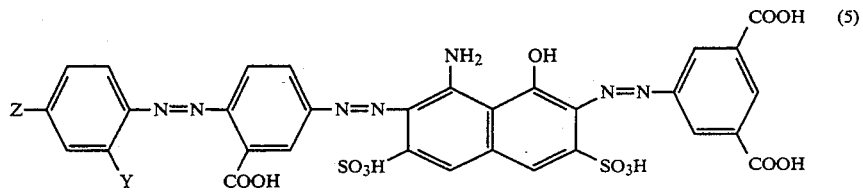

Stage 1

3-Carboxy-4-nitroaniline (18.2 g, 0.1M) was stirred in water (500 ml) at room temperature and 2N NaOH added to form a solution at pH 8.0. 2N NaNO$_2$ solution (50 ml) was added and the mixture stirred to homogenise. The solution was added gradually to a mixture of ice/water (150 ml) and 36% HCl (50 ml) at 5° C. and the resultant suspension stirred for 2 hours at 5° C. Sulphamic acid solution (10%) was added to destroy excess nitrous acid and give a first diazo suspension.

1-Hydroxy-8-aminonapthalene-3,6-disulphonic acid (39 g, 0.1M) was stirred in water (500 ml) and 2N NaOH added to form a solution at pH 7.0. The solution was added to above diazo suspension to give a dull red suspension which was stirred for 16 hours at 10° C., before raising the pH to 7.6 by addition of 2N NaOH solution. 25% NaCl (w/v) was added and the precipitated dye collected by filtration and washed with NaCl aqueous solution (30%, 500 ml) to give a paste.

Stage 2

5-Aminoisophthalic acid (18.1 g, 0.1M) was stirred in water (500 ml) at room temperature and 2N NaOH added to form a solution at pH 8.0. 2N NaNO$_2$ solution (50 ml) was added and the mixture stirred to homogenise. The solution was added gradually to a mixture of ice/water (150 ml) and 36% HCl (50 ml) at 5° C. and the resultant suspension stirred for 2 hour at 5° C. Sulphamic acid solution (10%) was added to destroy excess nitrous acid and give a second diazo suspension. The paste from Stage 1 (0.1M) was dissolved in water (400 ml) at pH 7.0 with addition of 2N NaOH solution and stirred at 0°–5° C. The second diazo suspension was added over 5 minutes maintaining the temperature below 5° C. and the pH at 6 to 7 using 2N NaOH solution.

Stage 3

Sodium sulfide (25 g) was added to the total liquor from Stage 2 and the solution stirred at room temperature for 4 hours, after which reduction of the nitro group was complete. To the resultant solution NH4Cl (25% w/v) was added and the precipitated dye collected by filtration and washed with 25% NH4Cl solution (500 ml). Stage 4

The paste from Stage 3 (0.1M) was dissolved in water (500 ml). 2N NaNO2 solution (50 ml) was added and the mixture stirred for 5 minutes before adding gradually to a mixture of ice/water (150 ml) and 36% HCl (50ml) at 5° C. with rapid agitation. The resultant suspension was stirred for 3 hours at 5° C. Sulphamic acid solution (10%) was added to destroy excess nitrous acid to give a third diazo suspension. 3-Aminophenol (10.9 g, 0.1M) was dissolved in water (150 ml) with addition of 2N NaOH solution at pH 9.0. The solution was then added to the third diazo suspension and the pH adjusted to 8-9 using 2N NaOH solution. The resultant solution was stirred for 2 hours at 0°-10° C., heated to 70° C., NH4Cl (10% w/v) was added and the precipitated dye collected by filtration and washed with 10% NH4Cl solution (500 ml).

The product was stirred in water (500 ml) at pH 8-9 until a complete solution was obtained. The solution was then slowly added to a mixture of concentrated hydrochloric acid (45 ml) and water (50 ml) and the suspension stirred for 30 minutes and then filtered to give a paste.

The paste was stirred in water (300 ml) and concentrated ammonium hydroxide added to raise the pH to 9-9.5. The solution was then dialysed to remove chloride ions and solvent evaporated to give the mixed ammonium-sodium salt of the title product having an Emax of 50,000 at 621 nm.

When made into an ink (2.6 parts of title product in water (92.5)/diethylene glycol (7.5)) and printed onto plain paper using a thermal ink jet printing machine, the printed image has a very high resistance to water and a deep black shade.

Examples of specific ink compositions include the following wherein the numbers represent parts by weight: title dye (2.5), water (60) and ethylene glycol (40); title dye (4.0), water (85), diethylene glycol (10) and 2-pyrollidone (5); title dye (1.0), water (90) and diethylene glycol (10); title dye (3.0), water (65), glycerol (25), triethanolamine (10) and sodium borate (0.2); and title dye (2.0), water (80), ethylene glycol (15) and N-methylpyrollidone (5).

EXAMPLES 16 to 22

The method of Example 15 may be repeated except that in place of 5-aminoisophthalic acid there is used 0.1 mole of the compound listed below:

| Example No | Compound |
|---|---|
| 16 | 2-carboxyaniline |
| 17 | 3-carboxyaniline |
| 18 | 4-carboxyaniline |
| 19 | 2-aminoterephthalic acid |
| 20 | 3-aminophthalic acid |
| 21 | 3-amino-4-methylbenzoic acid |
| 22 | 3-carboxy-4-piperizyl aniline |

EXAMPLES 23-27

The method of Example 15 may be repeated except that in place of 3-Aminophenol used in Stage 4 there is used 0.1 mole of the compound listed below:

| Example No | Compound |
|---|---|
| 23 | N-methyl-3-aminophenol |
| 24 | N,N-dimethyl-3-aminophenol |
| 25 | 1,3-diaminobenzene |
| 26 | 1,3-dihydroxybenzene |
| 27 | Sulpho-1,3-diaminobenzene |

EXAMPLE 28

Inks may be prepared having the composition stated in Table I below.

The following abbreviations are used:
PG = propylene glycol,
DEG = diethylene glycol,
NMP = N-methyl pyrrolidone,
DMK = dimethylketone,
IPA = isopropanol,
2P = 2-pyrollidone,
MIBK = methylisobutyl ketone,
CET = Cetyl ammonium bromide (a surfactant), and
BAS = 1:1 mixture by weight of ammonia and methylamine.

TABLE I

| Ink No. | Dye from Example | Dye Content | Water | PG | DEG | NMP | DMK | NaOH | IPA | CET | 2P | MIBK | BAS |
|---|---|---|---|---|---|---|---|---|---|---|---|---|---|
| 1 | 1 | 2.0 | 80 | 5 |  | 6 | 4 |  |  |  | 5 |  | 3 |
| 2 | 6 | 3.0 | 90 |  | 5 | 2 |  | 0.2 |  |  |  |  |  |
| 3 | 22 | 1.0 | 85 | 5 |  | 2 | 2 |  |  | 5 | 1 |  |  |
| 4 | 4 | 2.1 | 91 |  | 8 |  |  |  |  |  |  | 1 |  |
| 5 | 3 | 3.1 | 86 | 5 |  |  |  |  | 4 |  |  | 5 |  |
| 6 | 24 | 1.1 | 81 |  |  | 9 |  | 0.5 |  |  | 9 |  |  |
| 7 | 2 | 2.5 | 60 | 4 | 15 | 3 | 3 |  | 6 | 10 | 5 | 4 |  |
| 8 | 5 | 1.9 | 70 |  | 20 |  |  |  | 10 |  |  |  |  |
| 9 | 23 | 2.4 | 75 | 5 | 4 |  |  |  |  | 6 |  | 5 | 5 |
| 10 | 6 | 4.1 | 80 | 3 | 5 | 2 | 10 |  |  |  |  |  |  |
| 11 | 21 | 3.2 | 65 |  | 5 | 4 | 6 |  | 5 | 4 | 6 | 5 |  |
| 12 | 20 | 4.6 | 96 |  |  |  |  |  |  | 4 |  |  |  |
| 13 | 10 | 0.8 | 90 | 5 |  |  |  |  | 5 |  |  |  |  |
| 14 | 19 | 1.2 | 80 | 2 | 6 | 1 | 5 |  | 1 |  | 4 |  | 1 |
| 15 | 19 | 1.8 | 80 |  | 5 |  |  |  |  | 15 |  |  |  |
| 16 | 8 | 2.6 | 84 |  |  | 11 |  |  |  |  | 5 |  |  |
| 17 | 11 | 3.3 | 80 | 2 |  |  | 10 |  |  | 2 |  | 6 |  |
| 18 | 13 | 1.7 | 90 |  |  |  | 7 | 0.3 | 3 |  |  |  |  |
| 19 | 14 | 1.5 | 69 | 2 | 20 | 2 | 1 |  |  |  |  | 3 | 3 |

TABLE I-continued

| Ink No. | Dye from Example | Dye Content | Water | PG | DEG | NMP | DMK | NaOH | IPA | CET | 2P | MIBK | BAS |
|---|---|---|---|---|---|---|---|---|---|---|---|---|---|
| 20 | 12 | 1.6 | 91 | | | 4 | | | | | 4 | | 1 |

We claim:

1. A compound of Formula (1) or salt thereof:

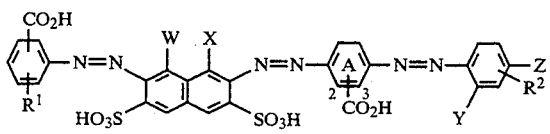

wherein:

$R^1$ is $CO_2H$;

$R^2$ is H, $C_{1-4}$-alkyl, $C_{1-4}$-alkoxy, $CO_2H$ or $SO_3H$;

$R^3$ and $R^4$ are each independently H, $C_{1-18}$-alkyl or $R^3$ and $R^4$, together with the nitrogen atom to which they are attached, form an optionally substituted 5- or 6-membered ring;

W is —OH and X is —NH$_2$, or W is —NH$_2$ and X is —OH; and

Y and Z are each independently —OH or —NR$^3$R$^4$.

2. A compound according to claim 1 wherein X is —OH and the carboxy group on Ring A is at the 2-position.

3. A compound according to claim 1 wherein X is —NH$_2$ and the carboxy group on Ring A is at the 3-position.

4. A compound according to any one of the preceding claims wherein one of Y and Z is —OH and the other is —NR$^3$R$^4$.

5. A compound according to claim 1 wherein $R^2$ is H.

6. A compound according to claim 1 wherein $R^3$ and $R^4$ are H or $C_{2-6}$-alkyl.

7. A compound according to claim 1 in the form of an ammonium or substituted ammonium salt.

8. A composition containing a first and second compound, each of which is of the Formula (1) or salt thereof:

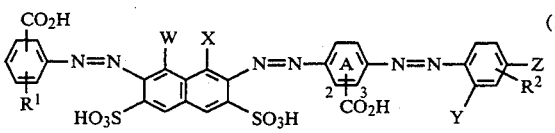

wherein:

$R^1$ is H, $C_{1-4}$-alkyl, $C_{1-4}$-alkoxy, $CO_2H$, $SO_3H$ or —NR$^3$R$^4$;

$R^2$ is H, $C_{1-4}$-alkyl, $C_{1-4}$-alkoxy, $CO_2H$, $SO_3H$;

$R^3$ and $R^4$ are each independently H, $C_{1-18}$-alkyl or $R^3$ and $R^4$, together with the nitrogen atom to which they are attached, form an optionally substituted 5- or 6-membered ring;

W is —OH and X is —NH$_2$, or W is —NH$_2$ and X is —OH; and

Y and Z are each independently —OH or —NR$^3$R$^4$; and wherein the first and second compound are identical in every respect except that in the first compound Y is —NH$_2$ and Z is —OH and in the second compound Y is —OH and Z is —NH$_2$.

9. An ink comprising one or more compounds of Formula (1) or salt thereof:

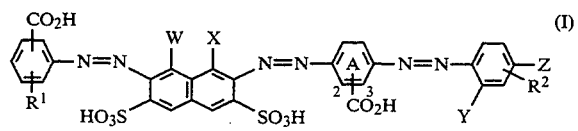

wherein:

$R^1$ is H, $C_{1-4}$-alkyl, $C_{1-4}$-alkoxy, $CO_2H$, $SO_3H$ or —NR$^3$R$^4$;

$R^2$ is H, $C_{1-4}$-alkyl, $C_{1-4}$-alkoxy, $CO_2H$, $SO_3H$;

$R^3$ and $R^4$ are each independently H, $C_{1-18}$-alkyl or $R^3$ and $R^4$, together with the nitrogen atom to which they are attached, form an optionally substituted 5- or 6-membered ring;

W is —OH and X is —NH$_2$, or W is —NH$_2$ and X is —OH; and

Y and Z are each independently —OH or —NR$^3$R$^4$; and a liquid medium wherein the liquid medium comprises water and a water-soluble organic solvent in a weight-to-weight ratio of 95:1 to 50:50.

10. An ink according to claim 9 wherein the liquid medium comprises water and a water-soluble organic solvent in a weight-to-weight ratio of 90:10 to 60:40.

11. A process for printing a substrate with an ink using an ink jet printer, characterised in that the ink contains at least one compound of Formula (1) or salt thereof

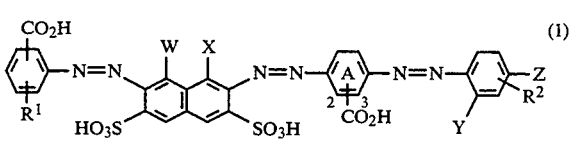

wherein:

$R^1$ is H, $C_{1-4}$-alkyl, $C_{1-4}$-alkoxy, $CO_2H$, $SO_3H$ or —NR$^3$R$^4$;

$R^2$ is H, $C_{1-4}$-alkyl, $C_{1-4}$-alkoxy, $CO_2H$, $SO_3H$;

$R^3$ and $R^4$ are each independently H, $C_{1-18}$-alkyl or $R^3$ and $R^4$, together with the nitrogen atom to which they are attached, form an optionally substituted 5- or 6-membered ring;

W is —OH and X is —NH$_2$, or W is —NH$_2$ and X is —OH; and

Y and Z are each independently —OH or —NR$^3$R$^4$; and which process comprises forming the ink into small droplets by ejection from a reservoir through a small orifice by the application of heat so that the droplets of ink are directed at the substrate.

12. Paper printed with a compound according to claim 1.

* * * * *